Aug. 7, 1923.　　　　　　　　　　　　　　　　　　　　1,464,358
M. GNOINSKY
ANIMAL TRAP
Filed Oct. 18, 1922
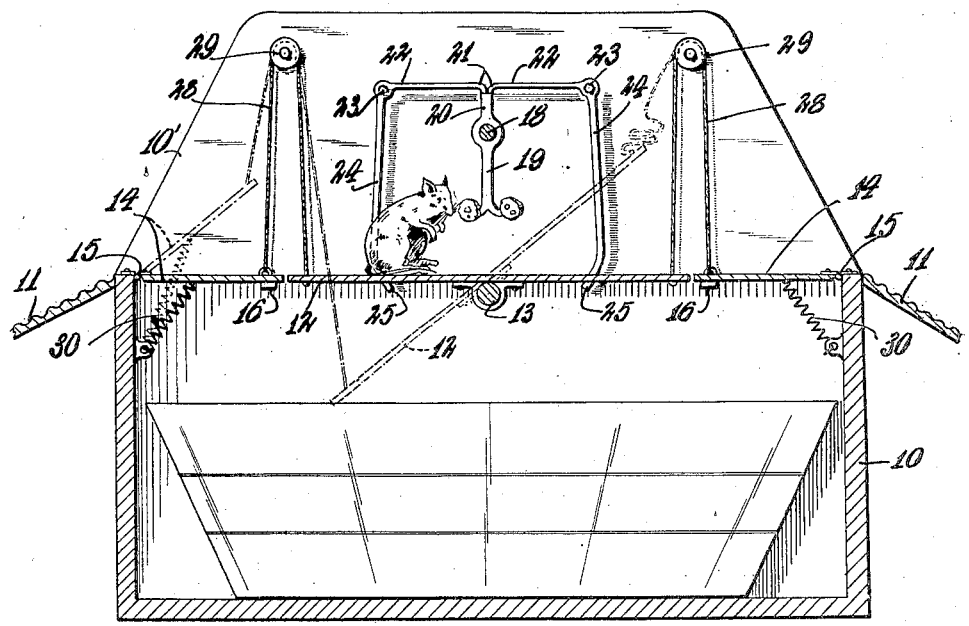
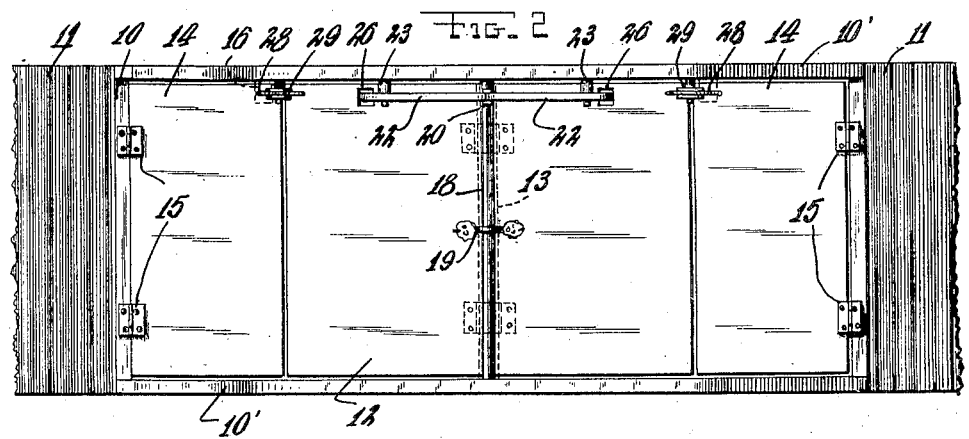
Inventor
Michael Gnoinsky
Attorney Patented Aug. 7, 1923.

1,464,358

UNITED STATES PATENT OFFICE.

MICHAEL GNOINSKY, OF ZEELAND, NORTH DAKOTA.

ANIMAL TRAP.

Application filed October 18, 1922. Serial No. 595,238.

*To all whom it may concern:*

Be it known that I, MICHAEL GNOINSKY, a citizen of the United States, residing at Zeeland, in the county of McIntosh and State of North Dakota, have invented certain new and useful Improvements in Animal Traps, of which the following is a specification.

This invention relates to animal traps, being intended more particularly for use in catching rats, mice, or like small rodents, although not of necessity limited to such use.

The invention has for an object to provide a novel and efficient animal trap of inexpensive construction.

For further comprehension of the invention, and of the objects and advantages thereof, reference will be had to the following description and accompanying drawings, and to the appended claims in which the various novel features of the invention are more particularly set forth.

Fig. 1 of the drawings is a longitudinal vertical sectional view of an animal trap constructed according to my invention.

Fig. 2 is a plan view thereof.

As here shown my improved animal trap comprises an oblong box 10 having inclined runways 11 at opposite ends leading up to the top thereof. The top of the box is made up of a central trap door 12, pivoted as at 13 midway between its ends, and a pair of end doors 14 hinged at the ends of the box as at 15. The free edges of these doors are supported by blocks 16 secured to the sides of the box.

The side walls of the box are preferably extended above the top as at 10', and extending between and journaled in said side walls is a rock-shaft 18 located above the centre of the door 12. This rock-shaft carries a double pronged hook 19 to receive the bait, which hook projects downward from the shaft midway between the side walls 10'.

Projecting upwardly from the shaft 18, adjacent the walls 10', are a pair of trigger arms 20 the ends of which are engaged by downturned fingers 21 on the ends of the horizontal arms 22 of two pairs of bell crank levers fulcrumed as at 23 on the side walls 10 and having vertical arms 24. The lower ends of these arms 24 are obliquely inclined or offset as at 25 and project through slots 26 in the door 12.

Secured at opposite ends to the adjacent free edges of the trap door 12 and the end doors 14 are cords 28 which are looped over pulleys 29 mounted on the side walls 10' these cords being stretched taut when all the doors are closed. Connected to the end doors 14 are light tension springs 30 which tend to move them down.

In Fig. 1 of the drawings I have shown the trap set. When the animal, attracted by the bait, climbs either of the runways 11 and walks on the door 12 the latter is kept from tilting by reason of the engagement of the inclined lower ends 25 of the bell crank levers with the door. When the bait is pulled, shaft 18 is rocked, moving the trigger arm 20 away from operative position and freeing the bell crank levers. The door 12 then tilts under the weight of the animal, while at the same time the door 14 at the adjacent end is lifted. When the animal is discharged into the box 10 the spring 30 causes both the end door and the trap door to close, preventing subsequent escape of the animal.

Having thus described my invention what I claim as new and desire to protect by Letters Patent of the United States is as follows:—

1. A trap comprising a box having in the top thereof a trap door hinged midway between its opposite ends, a bait-holding trigger arm pivoted to the trap above and in vertical alinement with hinge axes of the trap door, and a pair of door holding elements pressing longitudinally against the upper end of the said arm and adapted to be displaced from engagement with the said arm to free the door when the said arm is swung on its pivotal axis.

2. A trap comprising a box having in the top thereof a trap door hinged midway between its opposite ends, a bait-holding trigger arm pivoted to the trap above and in vertical alinement with hinge axes of the trap door, and a pair of door holding elements pressing longitudinally against the upper end of the said arm and adapted to be displaced from engagement with the said arm to free the door when the said arm is swung on its pivotal axis, said door holding elements comprising bell crank levers one arm of each of which engages the said bait-holding arm, and the other arm engages the said door.

3. A trap comprising a box having in the top thereof a trap door hinged midway between its opposite ends, a bait-holding trigger arm pivoted to the trap above and in vertical alinement with hinge axes of the trap door, and a pair of door holding elements pressing longitudinally against the upper end of the said arm and adapted to be displaced from engagement with the said arm to free the door when the said arm is swung on its pivotal axis, said door holding elements comprising bell crank levers one arm of each of which engages the said bait-holding arm, and the other arm engages the said door, the last mentioned arms of the said bell crank levers being obliquely inclined at their lower ends and projecting through slots in the said door and adapted to engage one wall of each of said slots to lock the door against movement.

4. A trap comprising a box having its top composed of a central door and a pair of end doors, the central door being pivoted between its ends, and the end doors hinged adjacent the ends of the box, the said box having its side walls extended upwardly beyond the top, a series of pulleys mounted on said side walls, a series of cords looped around said pulleys and connected to the adjacent edges of the central door and end doors, supports for the free edges of said end doors, springs urging said end doors downwardly, and a movable bait holding device adapted to hold said central door against movement.

In testimony whereof I have affixed my signature.

MICHAEL GNOINSKY.